(12) United States Patent
Lang et al.

(10) Patent No.: US 8,127,912 B2
(45) Date of Patent: Mar. 6, 2012

(54) FEEDBACK TORQUE LIMITER

(75) Inventors: David J. Lang, Rockford, IL (US);
James M. Regan, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 86 days.

(21) Appl. No.: 12/638,348

(22) Filed: Dec. 15, 2009

(65) Prior Publication Data
US 2011/0139566 A1 Jun. 16, 2011

(51) Int. Cl.
*B60T 7/12* (2006.01)

(52) U.S. Cl. .................. 192/223.3; 188/134

(58) Field of Classification Search ............ 192/223.3; 188/134; 244/99.9
See application file for complete search history.

(56) References Cited

U.S. PATENT DOCUMENTS

| 4,290,516 | A | 9/1981 | West et al. |
| 4,480,733 | A * | 11/1984 | Grimm et al. .......... 192/223.3 |
| 4,858,491 | A | 8/1989 | Shube |
| 5,092,539 | A | 3/1992 | Caero |
| 5,170,676 | A | 12/1992 | Matouka et al. |
| 5,630,490 | A | 5/1997 | Hudson et al. |
| 5,655,636 | A | 8/1997 | Lang et al. |
| 5,743,490 | A | 4/1998 | Gillingham et al. |
| 6,202,803 | B1 | 3/2001 | Lang |
| 7,143,888 | B2 | 12/2006 | Lang |
| 2008/0185242 | A1 * | 8/2008 | Mayer et al. ............ 188/181 T |

* cited by examiner

Primary Examiner — Richard M. Lorence
(74) Attorney, Agent, or Firm — Kinney & Lange, P.A.

(57) ABSTRACT

A feedback torque limiter device for an actuator having an input shaft, output shaft and gear reduction for transmitting torque from the input shaft to the output shaft comprises an output torque sensor, and input torque limiter and a feedback mechanism. The output torque sensor senses actuator output torque downstream from an actuator gear reduction. The input torque limiter grounds additional torque from the input shaft when engaged. The feedback mechanism engages the input torque limiter when the output torque sensed by the output torque sensor reaches a predetermined value.

18 Claims, 7 Drawing Sheets

FEEDBACK TORQUE LIMITER

BACKGROUND

The term actuator refers to a member of a class of mechanisms whose primary function is to provide a controllable force for moving an actuated element to a desired position. An actuator system typically includes an actuator, an actuated element, connecting linkage and a power source. Some actuator systems must also perform a force limiting function to prevent damage should the system become jammed. This is sometimes done through torque limiting devices on the actuator input shaft. An aircraft actuation system is an example of a system which may use a torque limiter as a force limiter for an actuator.

Numerous aircraft actuation systems utilize gear rotary actuators that contain torque limiters. On these systems, the torque limiter protects actuator reduction gearing and the downstream aircraft structure by limiting the actuator output torque to a predefined value in the event of an overload or a jam. These traditional torque limiters measure the torque that passes through them. This torque must include actuator drag torque due to cold temperature operation and sufficient torque to ensure operation with the minimum actuator efficiency under the maximum loaded condition. A maximum torque limiter setting for the actuator is determined based on these considerations. This maximum torque limiter setting is generally the limit load which can be imposed on the actuator. Actuator size, weight and envelope are determined from this maximum torque limiter setting.

SUMMARY

The present invention is directed toward a feedback torque limiter device for an actuator having an input shaft, output shaft and gear reduction for transmitting rotary motion from the input shaft to the output shaft. The device includes an output torque sensor that senses actuator output torque downstream from an actuator gear reduction, an input torque limiter that grounds additional torque from the input shaft when engaged, and a feedback mechanism that engages the input torque limiter when the output torque sensed by the output torque sensor reaches a predetermined value.

The present invention is also directed toward a method of limiting torque through an actuator. The method includes receiving input torque at an input shaft, transmitting the input torque through a gear reduction to an output shaft, sensing actuator output torque downstream from the actuator gear reduction, engaging an input torque limiter when the output torque sensed reaches a predetermined value, and grounding additional torque when the input torque limiter is engaged.

BRIEF DESCRIPTION OF THE DRAWINGS

FIG. 3b is a side view of the output torque sensor from line B-B of FIG. 3a.

DETAILED DESCRIPTION

Figure 1:
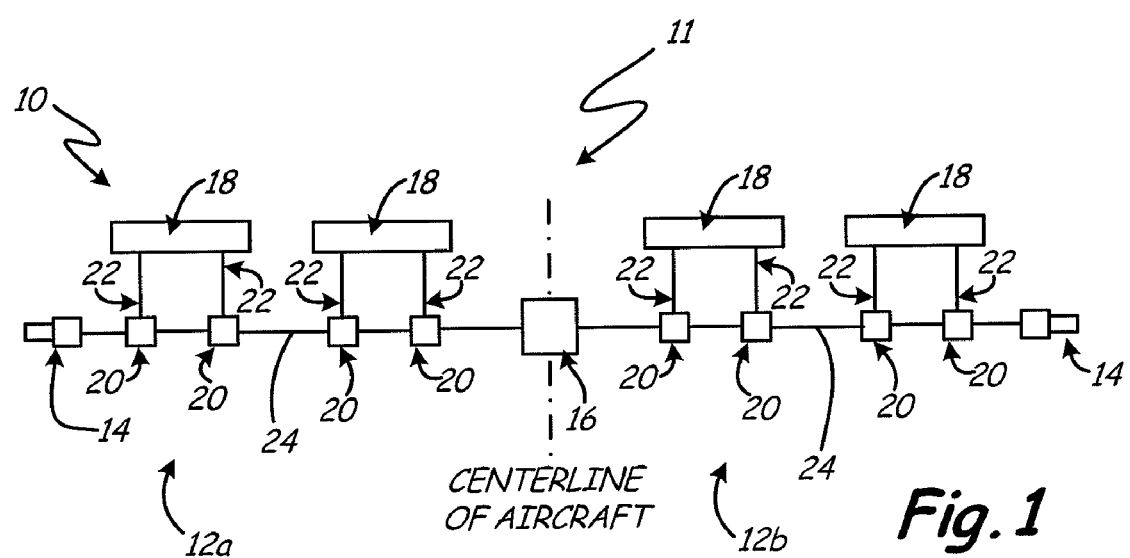
FIG. 1 is a typical slat actuation system on an aircraft.

FIG. 1 illustrates a typical slat actuation system 10 on an aircraft 11. The system is located on left wing 12a and right wing 12b of aircraft 11, and includes asymmetry brakes 14, power drive unit 16, slat panels 18, slat actuators 20, slat panel linkage 22 and torque shafting 24. Each slat panel 18 is connected to either wing 12a or 12b by two slat panel linkage mechanisms 22, with each linkage mechanism connected to slat actuation system 10 through a slat actuator 20. The power drive unit 16 connects to each slat actuator 20 through the torque shafting 24.

Prior to flight or upon landing, power drive unit 16 powers slat actuators 20 to extend slat panels 18 away from wings 12a and 12b and into the airstream. Slat panel linkages 22 are used to extend slat panels 18, and asymmetry brakes 14 work with power drive unit 16 to hold slat panels 18 in place. Once airborne, power drive unit 16 powers slat actuators 20 to retract slat panels 18 toward wings 12a and 12b to cut down on drag during flight.

In some instances, there is a jam in slat panel linkage 22 when slat actuator 20 is driving the linkage 22 to extend or retract slat panel 18. When a jam occurs, power drive unit 16 could generate enough torque to damage the slat panel or structure of the aircraft. Therefore, a torque limiter is usually included in each slat actuator 20. The torque limiter senses the torque going through actuator 20 to slat panel 18. If the torque sensed gets too high, the torque limiter locks up and grounds any additional torque coming from power drive unit 16.

Traditional torque limiters measure the torque that passes through them. This includes actuator drag torque due to cold temperature operation and sufficient torque to ensure operation with the minimum actuator efficiency under the maximum loaded condition. The maximum torque limiter setting is generally the limit load imposed on the actuator and determines actuator size and weight. The feedback torque limiter of the current invention minimizes the effect of the cold temperature drag torques and the efficiency variation by sensing the output torque directly at the actuator output shaft through an output torque sensor. When the actuator output torque reaches a predetermined value at the output shaft (sensed by the output torque sensor), a feedback mechanism engages the input torque limiter on the input shaft of the actuator to ground any additional torque.

Figure 2:
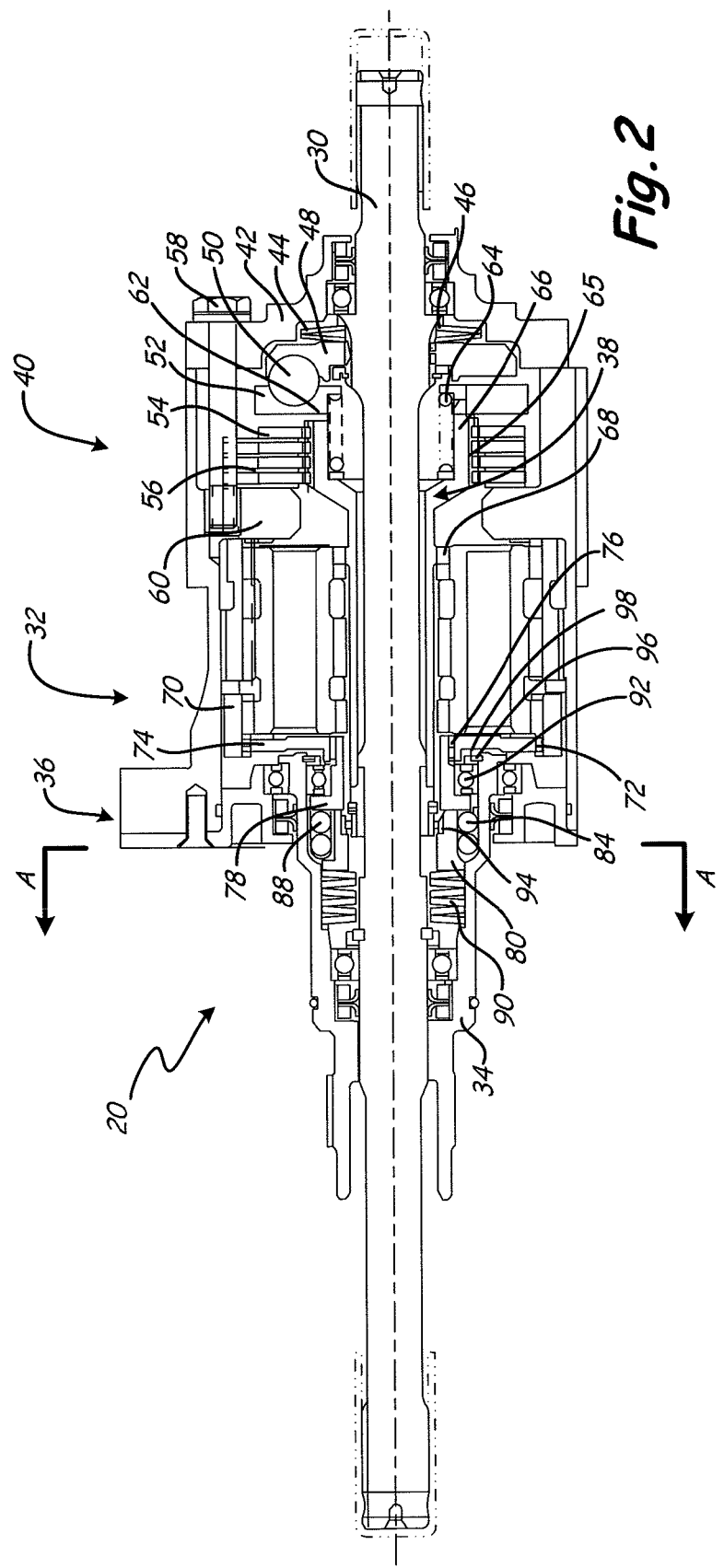
FIG. 2 is an actuator with a feedback torque limiter of the current invention.

FIG. 2 shows actuator 20 with a feedback torque limiter according to the current invention. Actuator 20 includes the following main parts: actuator input shaft 30, gear reduction 32, actuator output shaft 34 and a feedback torque limiter formed by output torque sensor 36, feedback mechanism 38 and input torque limiter 40. Torque is applied to actuator 20 by rotating input shaft 30. This rotary motion is transferred from input shaft 30 to gear reduction 32, and then from gear reduction 32 to output shaft 34. Rotation of output shaft 34 provides drive to extend or retract slat panels through linkage mechanisms as shown in FIG. 1. Output torque sensor 36 senses torque in actuator output shaft 34. When this output torque exceeds a predetermined value (indicating there is a jam, as discussed in relation to FIG. 1), feedback mechanism 38 engages input torque limiter 40 to ground any additional torque from the input shaft 30.

In addition to the main parts discussed above, actuator 20 also includes (in order from input to output): cover 42, disc springs 44, spline connection 46, input ball ramp 48, balls 50, mating ball ramp 52, friction disc set 54, stationary disc set 56, bolts 58, housing 60, tangs 62, spring 64, spline 65, sun shaft 66, gear 68, gear reduction output ring 70, spline connection 72, web plate 74, spline connection 76, output torque sensor input shaft 78, piston 80, straight ball spline 82 with balls 84, helical ball spline 86 with balls 88, disc springs 90, bearings 92 and 94, retaining ring 96 and keeper 98.

Input torque limiter 40 is formed by: cover 42, disc springs 44, input ball ramp 48, balls 50, mating ball ramp 52, friction disc set 54, stationary disc set 56, bolts 58, and housing 60. Feedback mechanism 38 is formed by: spring 64 and sun shaft 66. Output torque sensor 36 is formed by: output torque sensor input shaft 78, piston 80, disc springs 90 and output shaft 34. Piston 80 includes straight ball spline 82 with balls 84, and helical ball spline 86 with balls 88. Helical ball spline 86 is formed with torque sensor input shaft 78 (see FIGS. 3a-3b).

Actuator input shaft 30 is connected through spline connection 46 to input ball ramp 48. Input ball ramp 48 is in contact with balls 50, which are in contact with mating ball ramp 52, all held in contact by springs 64. Stationary disc set 56 is connected through bolts 58 to housing 60. Friction disc set 54 is connected to sun shaft 66 by spline 65 and rotates with sun shaft 66. When input torque limiter 40 is engaged, mating ball ramp 52 is in contact with friction disc set 54 and stationary disc set 56 and input ball ramp 48 is in contact with cover 42. Mating ball ramp 52 is connected through tangs 62 to sun shaft 66. Spring 64 and disc springs 44 work to ensure that ball ramps 48, 52 and balls 50 are in contact. Spring 64 also presses sun shaft 66 into contact with output torque sensor 36 by loading bearing 94 against piston 80. Gear 68 on sun shaft 66 is connected to actuator gear reduction 32. Gear reduction output ring gear 70 is connected through spline connection 72 to web plate 74. Web plate 74 is connected through spline connection 76 to output torque sensor input shaft 78. Output torque sensor input shaft 78 is connected to piston 80, which contains straight ball spline 82. Helical ball spline 86 (containing balls 88) is formed from torque sensor input shaft 78 and piston 80. Piston 80 is in contact with disc springs 90 and with output shaft 34 through balls 84 in straight ball spline 82.

Torque is applied to actuator 20 by rotating actuator input shaft 30. That torque is transmitted through input ball ramp 48, balls 50, mating ball ramp 52 and to sun shaft 66 through tangs 62. Gear 68 on the sun shaft 66 inputs torque to gear reduction 32. Gear reduction output ring gear 70 transmits torque to web plate 74 through spline 72. Web plate 74 then transmits torque to output torque sensor 36. Actuator gear reduction 32 can be any type of gear system including but not limited to a simple gear arrangement, epicyclic gearing, worm gearing, or wheel gearing.

Output torque sensor input shaft 78 receives torque from web plate 74 by spline 76. Helical ball spline 86 (FIG. 3b) transmits torque from torque sensor input shaft 78 to piston 80 through balls 88. An axial load generated by helical ball spline 86 is reacted by bearing 92. Helical ball spline 86 reacts torque from torque sensor input shaft 78 and imparts an axial load to disc springs 90. Helical ball spline 86 also imparts torque to straight ball spline 82, through balls 84, and to output shaft 34. The axial load generated by helical ball spline 86 is contained within output shaft 34 by retaining ring 96 and keeper 98. A preload torque for piston 80 is provided by disc springs 90. As output torque sensor input shaft 78 rotates, output torque increases. When the output torque exceeds the preload torque through helical ball spline 86, piston 80 will move towards disc springs 90. As output torque sensor input shaft 78 continues to rotate, piston 80 will continue moving towards disc springs 90. As this happens, bearing 94, sun shaft 66 and mating ball ramp 52 will move axially towards disc springs 90. After enough movement axially toward disc springs 90, mating ball ramp 52 will contact rotating friction disc set 54 and stationary disc set 56. When mating ball ramp 52 contacts rotating friction disc set 54 and stationary disc set 56, input torque limiter 40 is engaged. Any additional torque applied to actuator will transfer through input ball ramp 48, balls 50, mating ball ramp 52, friction disc set 54, stationary disc set 56 and bolts 58 to be grounded into actuator housing 60. Additionally, as mating ball ramp 52 moves axially toward disc springs 90, balls 50 roll up their ramps. As balls 50 roll up the ramps, the jam torque is transmitted through ball ramps 48 and 52, pushing input ball ramp 48 against disc springs 44, eventually resulting in input ball ramp 48 being in contact with cover 42. A small amount of jam torque is then grounded into housing 60 through pins (not shown) connecting cover 42 to housing 60.

Placing output torque sensor 36 downstream from actuator gear reduction 32 minimizes the effect of efficiency and tare losses by the actuator gear reduction. The output torque sensor placed downstream from actuator gear reduction is able to directly sense torque at the output and engage the torque limiter when the torque at the output reaches a predetermined value. By placing the input torque limiter at the input, once engaged, the torque limiter can ground any additional torque into the housing without the additional torque being first magnified by the actuator gear reduction. Bypassing the drag torques and efficiency results in a narrow bandwidth for torque limiter torque values, and therefore a lower torque limiter load on the actuator. So the placement of input torque limiter 40 at the input and the output torque sensor 36 downstream from actuator gear reduction 32 (with feedback mechanism 38 to engage input torque limiter 40 when output torque sensor 36 reaches a predetermined value) allows the actuator size and weight to be reduced due to the lower torque limiter load on the actuator. This may also allow a reduction in the size and weight of the aircraft structure required to resist actuator jam torque.

Figure 3A:
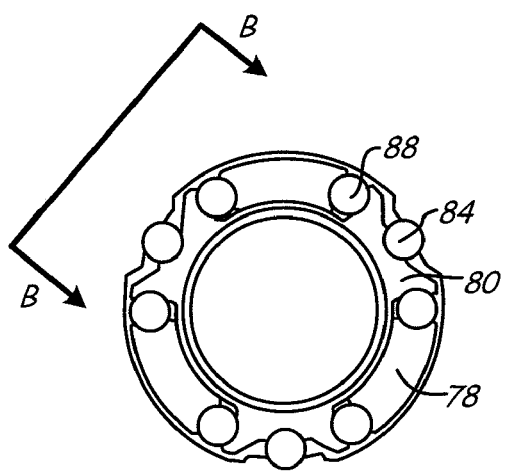
FIG. 3a is a cross-sectional view of the output torque sensor of the current invention taken along line A-A of FIG. 2.
Figure 3B:
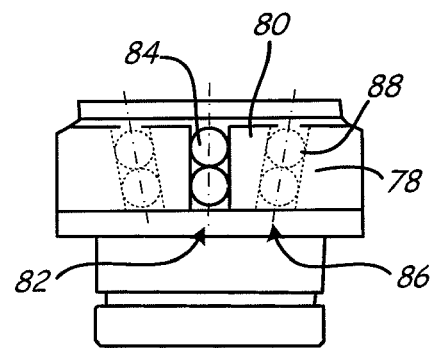

FIG. 3a is a cross-sectional view of the output torque sensor of the current invention taken along line A-A of FIG. 2. FIG. 3b is a side view of the output torque sensor from line B-B of FIG. 3a. These views of output torque sensor 36 include output torque sensor input shaft 78, piston 80, balls 88 of helical ball spline 86, and balls 84 of straight ball spline 82.

Helical ball spline 86 contains balls 88 and is connected to output torque sensor input shaft 78 and piston 80. Straight ball spline 82 contains balls 84 and is connected to piston 80 and output shaft 34.

Output torque sensor input shaft 78 receives torque. Helical ball spline 86 transmits that torque to piston 80 through balls 88. Helical ball spline 86 also imparts an axial load to disc springs 90 (shown in FIG. 2) and torque to straight ball spline 82 through balls 84 to output shaft 34. The slight angle in helical ball spline 86, shown in FIG. 3b, allows the torque to generate an axial force. When that axial force overcomes the force of disc springs 90, the springs compress and piston 80 moves toward disc springs 90.

FIGS. 4a-6b show the three main components in sensing output torque: output shaft 34, piston 80 and output torque sensor input shaft 78. These are shown with simplified forces to show their individual reactions to an output torque. FIGS. 4a-6b include output torque $T_o$, output torque sensor input torque $T_i$, disc springs 90 force $F_S$, force $F_1$ that resists output torque torsionally, piston force $F_2$, and axial force $F_3$. For simplicity, only one straight ball spline is shown reacting torque; and balls, springs, bearings and other components which contact output shaft 34, piston 80 and output torque sensor input shaft 78 are not shown.

Figure 4A:
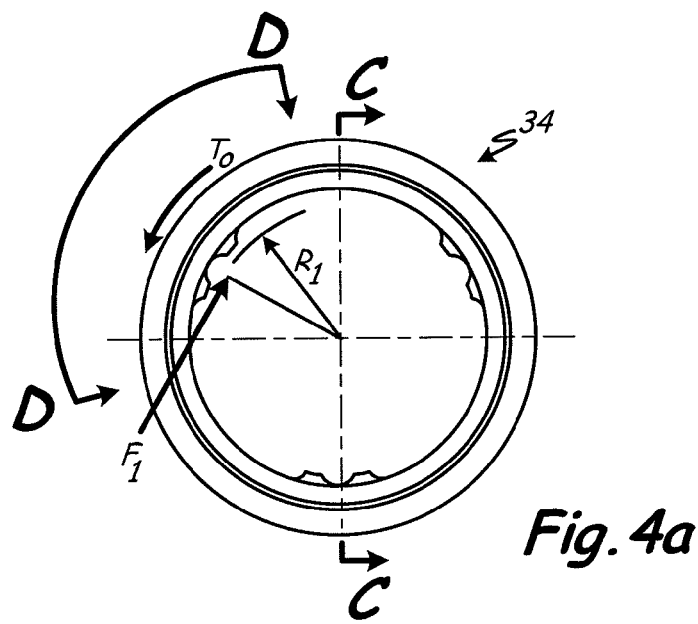
FIG. 4a is a cross-sectional view of the output shaft with a simplified view of forces to show its reaction to output torque.
Figure 4B:
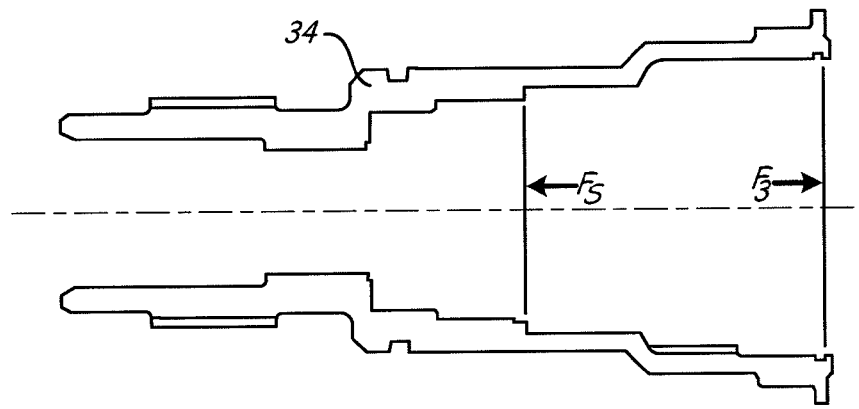
FIG. 4b is a cross sectional view of the FIG. 4a taken along line C-C and showing a simplified view of forces acting on it.
Figure 4C:
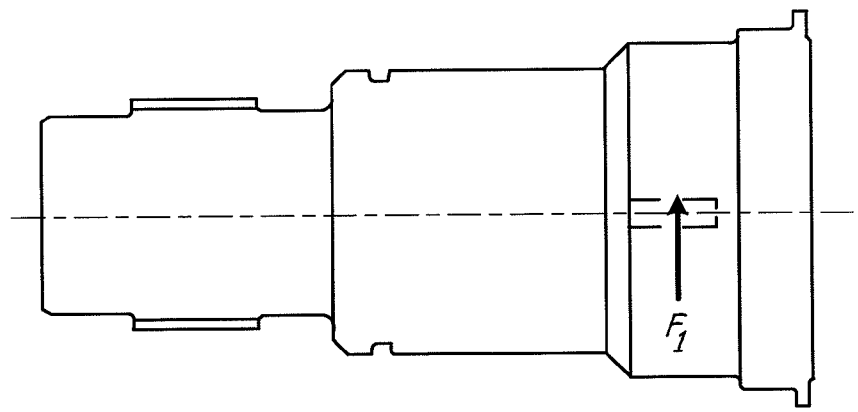
FIG. 4c is a side view of FIG. 4a seen from D-D and showing a simplified view of forces acting on it.

FIG. 4a is a cross-sectional view of the output shaft 34. FIG. 4b is a cross sectional view of output shaft in FIG. 4a. FIG. 4c is a side view of output shaft of FIG. 4a. Forces acting on output shaft 34 include output torque $T_o$, disc springs 90 force $F_S$, force $F_1$ that resists output torque torsionally, and axial force $F_3$.

Output torque $T_o$ is applied to output shaft 34. Output torque $T_o$ is resisted torsionally by force $F_1$ at ball spline pitch radius $R_1$. FIG. 4b shows disc springs 90 force $F_S$ and axial load $F_3$ (generated by output torque reacted by helical ball spline 86). FIG. 4c shows force $F_1$ being applied to straight ball spline groove 82 in output shaft 34.

Figure 5A:
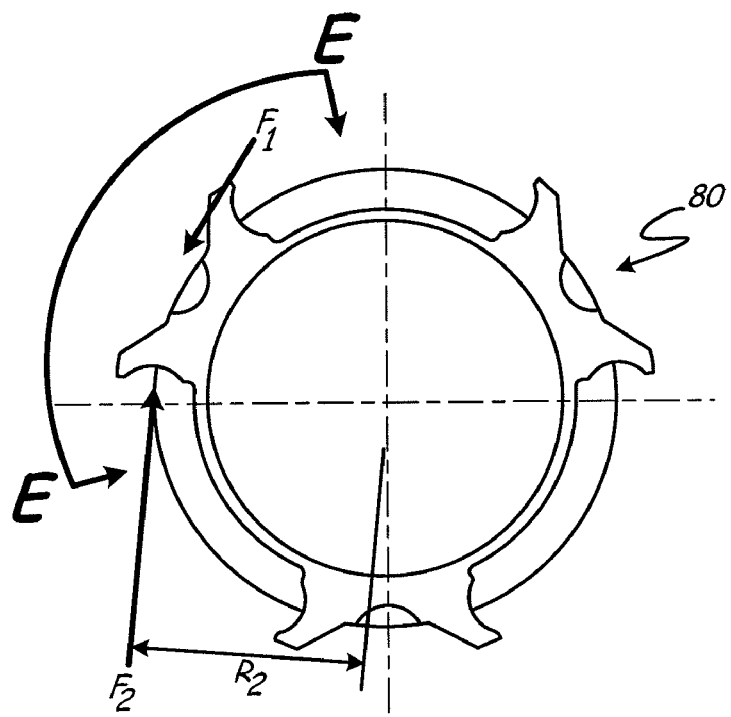
FIG. 5a is an end view of the piston with a simplified view of forces acting on it.
Figure 5B:
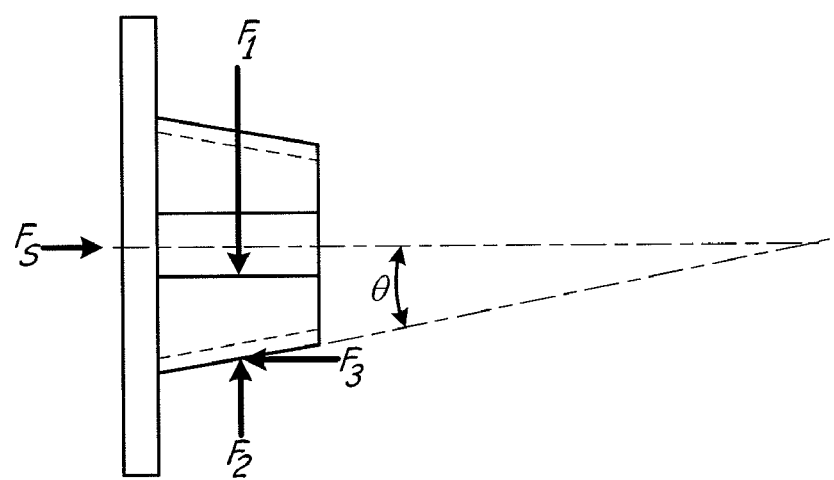
FIG. 5b is a side view of FIG. 5a taken along E-E and showing a simplified view of forces acting on it.

FIG. 5a is an end view of the piston 80. FIG. 5b is a side view of piston 80 in FIG. 5a along E-E. Forces acting on piston include disc springs 90 force $F_S$, force $F_1$ that resists output torque torsionally, piston force $F_2$, and axial force $F_3$.

Force $F_1$ is reacted by piston force $F_2$ as shown in FIGS. 5a and 5b. FIG. 5b shows axial force $F_3$, generated by output torque reacted by helical ball spline 86, and applied to helical ball spline groove 86 at $F_2$ location due to the helix angle θ of the ball spline and $F_2$. This axial force $F_3$ is reacted by disc springs 90 force $F_S$. Because helix angle θ of the ball spline is shallow, a small spring force $F_S$ can resist a large force $F_1$ generated by the output torque.

Figure 6A:
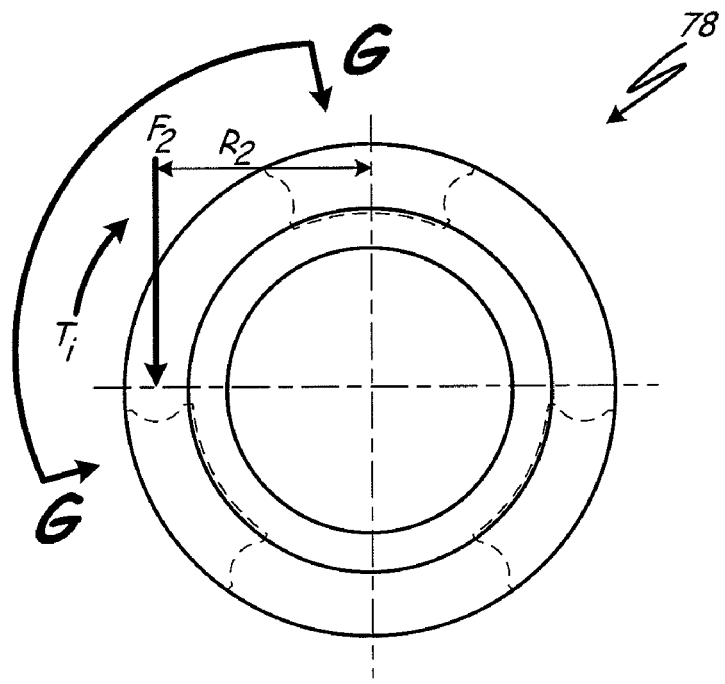
FIG. 6a is an end view of the output torque sensor input shaft and a simplified view of forces acting on it.
Figure 6B:
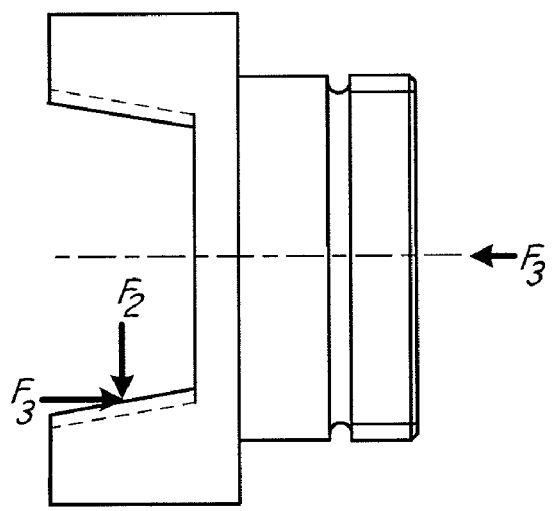
FIG. 6b is a side view of FIG. 6a along G-G and showing a simplified view of forces acting on it.

FIG. 6a is an end view of the output torque sensor input shaft 78. FIG. 6b is a side view of the output torque sensor input shaft in FIG. 6a along G-G. Forces acting on output torque sensor input shaft 78 include output torque sensor input torque $T_i$, piston force $F_2$, and axial force $F_3$.

Piston force $F_2$ is reacted by output torque sensor input torque $T_i$ acting on output torque sensor input shaft 78. FIG. 6b shows piston force $F_2$ and axial force $F_3$ acting on output torque sensor input shaft 78.

Figure 7A:
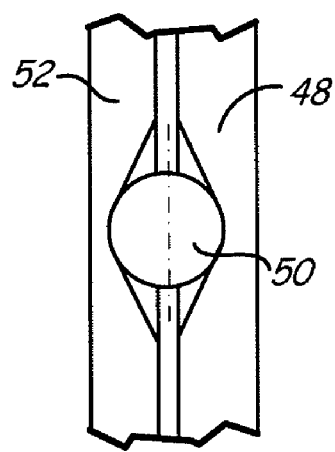
FIG. 7a is a view of the input torque limiter ball ramps with no input torque.
Figure 7B:
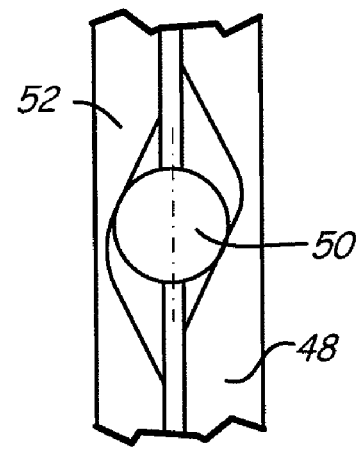
FIG. 7b is a view of the input torque limiter ball ramps with input torque.

FIG. 7a shows input torque limiter ball ramp 48, balls 50 and mating ball ramp 52 with no torque. FIG. 7b shows input torque limiter ball ramp 48, balls 50 and mating ball ramp 52 with torque.

Input ball ramp 48, balls 50 and mating ball ramp 52 are held in place to ensure contact with each other by spring 64 and disc springs 44 (shown in FIG. 2). When there is no input torque, as shown in FIG. 5a, balls 50 rest between ball ramps 48, 52. When there is input torque, as shown in FIG. 5b, mating ball ramp 52 moves according to the amount of input torque, balls 50 roll up the ramps, and input ball ramp 48 moves accordingly as well.

As demonstrated above, the feedback torque limiter of the current invention lowers the torque limiter load on the actuator. This is due to the torque sensor of the current invention being placed downstream of the gear reduction, minimizing the effects of the variation in efficiency and tare losses in the actuator gear reduction. The engagement mechanism allows the input torque limiter to be placed at the input shaft, which allows additional torque to be grounded without being first magnified by the actuator gear ratio. The reduction in the torque limiter load allows for a smaller and lighter actuator. This feedback torque limiter would also allow for a smaller and lighter aircraft structure that is necessary to resist the actuator jam torque.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A feedback torque limiter device for an actuator having an input shaft, output shaft and gear reduction for transmitting torque from the input shaft to the output shaft, the device comprising:
   an output torque sensor that senses actuator output torque downstream from the gear reduction, wherein the output torque sensor comprises:
      a torque sensor input shaft that receives torque from the gear reduction;
      a piston that receives torque from the torque sensor input shaft, transmits torque to the actuator output shaft and connects to a feedback mechanism; and
      disc springs to provide a preload torque to the piston; and
   an input torque limiter that grounds additional torque from the input shaft when engaged;
   wherein the feedback mechanism engages the input torque limiter when the output torque sensed by the output torque sensor reaches a predetermined value.

2. The device of claim 1, and further comprising:
   a straight ball spline connecting the piston and the actuator output shaft to transmit torque from the piston to the output shaft through balls contained in the straight ball spline; and
   a helical ball spline connecting the piston and the torque sensor input shaft to react torque from the torque sensor input shaft, impart torque to the straight ball spline and impart an axial load on the disc springs.

3. The device of claim 2, wherein when the torque through the helical ball spline in the piston exceeds the preload torque, the piston moves towards the disc springs.

4. The device of claim 3, wherein the input torque limiter comprises:
   an input ball ramp that receives torque from the input shaft of the actuator;
   a mating ball ramp that transmits torque and is connected to the feedback mechanism;
   balls that transfer torque from the input ball ramp to the mating ball ramp;
   springs to hold the input ball ramp, balls and mating ball ramp in contact;
   a friction disc set;
   a stationary disc set; and
   bolts connecting the stationary disc set to an actuator housing to ground additional torque into the housing when the input torque limiter engages by mating ball ramp moving into contact with the friction disc set and the stationary disc set.

5. The device of claim 4, wherein the feedback mechanism comprises:
   a sun shaft connected to the piston of the output torque sensor and to the mating ball ramp of the input torque limiter to engage the output torque limiter by axially moving the mating ball ramp into contact with the friction disc set and the stationary disc set, so that any torque from input shaft through input ball ramp, balls and mating ball ramp is grounded through the friction disc set and the stationary disc set into the housing by the bolts when the piston of the torque sensor has moved a predetermined amount toward the disc springs; and a spring to ensure the ball ramps and balls are in contact and to press the sun shaft into contact with the piston of the output torque sensor through a bearing.

6. The device of claim 5, wherein when the input torque limiter is not engaged, torque is transmitted from the input shaft of the actuator, through the input ball ramp, the balls, the mating ball ramp, to the sun shaft and into the actuator gear reduction.

7. The device of claim 1, wherein the feedback mechanism comprises:
   a sun shaft connected to the output torque sensor and to the input torque limiter to engage the input torque limiter when the output torque sensed by the output torque sensor reaches a predetermined value; and
   a spring to ensure the input torque limiter is in contact with the sun shaft and to press the sun shaft into contact with the output torque sensor.

8. The device of claim 1, wherein the gear reduction is simple gearing, epicyclic gearing, worm gearing or wheel gearing.

9. A feedback torque limiter device for an actuator having an input shaft, output shaft and gear reduction for transmitting torque from the input shaft to the output shaft, the device comprising:
   an output torque sensor that senses actuator output torque downstream from the gear reduction;
   an input torque limiter that grounds additional torque from the input shaft when engaged, the input torque limiter comprising:
      an input ball ramp that receives torque from the input shaft of the actuator;
      a mating ball ramp that transmits torque and is connected to a feedback mechanism;
      balls that transfer torque from the input ball ramp to the mating ball ramp;
      springs to hold the input ball ramp, balls and mating ball ramp in contact;
      a friction disc set;
      a stationary disc set; and
      bolts connecting the stationary disc set to an actuator housing;
      wherein, the input torque limiter is engaged when the feedback mechanism has moved the mating ball ramp into contact with the rotating friction disc set and the stationary disc, and any torque from input shaft through input ball ramp, balls and mating ball ramp is grounded through the friction disc set and the stationary disc set into the housing by the bolts; and
   wherein the feedback mechanism engages the input torque limiter when the output torque sensed by the output torque sensor reaches a predetermined value.

10. The device of claim 9, wherein when the input torque limiter is engaged, the input ball ramp compresses against input torque limiter disc springs and contacts a cover.

11. The device of claim 9, wherein the feedback mechanism comprises:
   a sun shaft connected to the output torque sensor and to the mating ball ramp of the input torque limiter to move the mating ball ramp into contact with the friction disc set and the stationary disc set when the output torque sensed by the output torque sensor reaches a predetermined value; and
   a spring to ensure ball ramps and balls are in contact and to press the sun shaft into contact with the output torque sensor.

12. An actuator comprising:
   an input shaft driven by a power drive unit;
   an output shaft;
   gear reduction for transmitting rotary motion from the input shaft to the output shaft;
   a housing;
   an output torque sensor that senses actuator output torque downstream from the gear reduction and comprising:
      a torque sensor input shaft that receives torque from the gear reduction;
      a piston that connects to a feedback mechanism;
      disc springs to provide a preload torque to the piston;
      a straight ball spline connecting the piston and the actuator output shaft to transmit torque from the piston to the output shaft through balls contained in the straight ball spline; and
      a helical ball spline connecting the piston and the torque sensor input shaft to react torque from the torque sensor input shaft, impart torque to the straight ball spline and impart an axial load on the disc springs;
      wherein when the torque through the helical ball spline exceeds the preload torque provided by the disc springs, the piston moves towards the disc springs; and
   an input torque limiter that grounds additional torque from the power drive unit into the housing when engaged;
   wherein the feedback mechanism engages the input torque limiter when the output torque sensed by the output torque sensor reaches a predetermined value.

13. The actuator of claim 12, wherein the input torque limiter comprises:
   an input ball ramp that receives torque from the input shaft of the actuator;
   a mating ball ramp that transmits torque and is connected to the feedback mechanism;
   balls that transfer torque from the input ball ramp to the mating ball ramp;
   springs to hold the input ball ramp, mating ball ramp and balls in contact;
   a friction disc set;
   a stationary disc set; and
   bolts connecting the stationary disc set to the actuator housing.

14. The actuator of claim 13, wherein the feedback mechanism comprises:
   a sun shaft connected to the piston of the output torque sensor through a bearing and to the mating ball ramp of the input torque limiter to move the mating ball ramp axially to engage the input torque limiter as the piston moves toward the disc springs; and
   a spring to ensure the ball ramps and balls are in contact and to press the sun shaft into contact with the output torque sensor by loading the bearing against the piston.

15. The actuator of claim 14, wherein when output torque at the output torque sensor exceeds the preload torque, the piston moves towards the output torque sensor disc springs; and the bearing, the sun shaft and the mating ball ramp move axially toward the output torque sensor disc springs as the input shaft continues to rotate.

16. The actuator of claim 15, wherein the input torque limiter is engaged when the piston, the sun shaft and mating ball ramp have moved axially enough that the mating ball ramp is in contact with the rotating friction disc set and the stationary disc set, and any torque from the actuator input shaft transmitted through input ball ramp, balls and mating ball ramp is grounded through the friction disc set and the stationary disc set into the housing by the bolts.

17. A method of limiting torque through an actuator, the method comprising:
  receiving input torque at an input shaft;
  transmitting the input torque through a gear reduction to an output shaft;
  sensing actuator output torque downstream from the gear reduction using a torque sensor input shaft to receive torque from the gear reduction, a piston to receive torque from the torque sensor input shaft, and to transmit torque to the output shaft and connects to a feedback mechanism; and disc springs to provide a preload torque to the piston;
  engaging an input torque limiter when the output torque sensed reaches a predetermined value; and
  grounding additional torque when the input torque limiter is engaged.

18. The method of claim 17, wherein the feedback mechanism engages the input torque limiter when the output torque sensed reaches a predetermined value.

* * * * *